United States Patent
Li et al.

(10) Patent No.: US 12,433,680 B2
(45) Date of Patent: Oct. 7, 2025

(54) AUTOMATIC, PATIENT-SPECIFIC TARGETING FOR DEEP BRAIN STIMULATION

(71) Applicant: ClearPoint Neuro, Inc., Solana Beach, CA (US)

(72) Inventors: Chen Li, Lebanon, NH (US); Damon Hyde, Somerville, MA (US); Lyubomir Zagorchev, Burlington, MA (US)

(73) Assignee: ClearPoint Neuro, Inc., Solana Beach, CA (US)

( * ) Notice: Subject to any disclaimer, the term of this patent is extended or adjusted under 35 U.S.C. 154(b) by 226 days.

(21) Appl. No.: 18/169,583

(22) Filed: Feb. 15, 2023

(65) Prior Publication Data
US 2024/0268891 A1    Aug. 15, 2024

(51) Int. Cl.
*A61B 34/10*    (2016.01)
*A61N 1/05*    (2006.01)
(Continued)

(52) U.S. Cl.
CPC .............. *A61B 34/10* (2016.02); *G06T 17/20* (2013.01); *G06T 19/20* (2013.01); *G16H 50/70* (2018.01);
(Continued)

(58) Field of Classification Search
CPC .............. A61B 34/10; A61B 2034/105; A61B 2034/107; A61N 1/0534; G06T 17/20;
(Continued)

(56) References Cited

U.S. PATENT DOCUMENTS

| | | | |
|---|---|---|---|
| 8,295,935 B2 * | 10/2012 | Okun | A61N 1/0534 607/45 |
| 2005/0004617 A1 * | 1/2005 | Dawant | A61B 90/10 607/45 |

(Continued)

OTHER PUBLICATIONS

Li et al., "Model-Based Image Updating for Brain Shift in Deep Brain Stimulation Electrode Placement Surgery", IEEE Transactions on Biomedical Engineering, vol. 67, No. 12, Dec. 2020, p. 3542-3552. (Year: 2020).*

(Continued)

*Primary Examiner* — Sing-Wai Wu
(74) *Attorney, Agent, or Firm* — Sheppard Mullin Richter & Hampton LLP

(57) ABSTRACT

Examples of the presently disclosed technology provide new systems and methods for performing direct targeting for DBS procedures (and other related procedures) using a single pre-operative scan of a patient's brain. Examples can achieve this single-scan direct targeting by leveraging mesh vertex-based correspondences between patient-specific 3D mesh brain structure representations across prospective and historical DBS procedures. Examples can leverage such correspondences to accurately predict DBS lead placement coordinates for a prospective DBS procedure based on historical DBS lead placement coordinates from the historical DBS procedures. Accordingly, a clinician performing the prospective DBS procedure can utilize the predicted DBS lead placement coordinates for surgical planning purposes.

19 Claims, 10 Drawing Sheets

(51) Int. Cl.
  *G06T 17/20*    (2006.01)
  *G06T 19/20*    (2011.01)
  *G16H 50/70*    (2018.01)

(52) U.S. Cl.
  CPC ... *A61B 2034/105* (2016.02); *A61B 2034/107* (2016.02); *A61N 1/0534* (2013.01); *G06T 2219/2021* (2013.01)

(58) Field of Classification Search
  CPC . G06T 19/20; G06T 2219/2021; G16H 50/70; G16H 50/50; G16H 20/40
  See application file for complete search history.

(56) References Cited

U.S. PATENT DOCUMENTS

| | | | |
|---|---|---|---|
| 2007/0223815 A1* | 9/2007 | Makram-Ebeid | G06V 10/26 382/173 |
| 2016/0030750 A1* | 2/2016 | Bokil | G16H 50/50 607/45 |
| 2021/0196430 A1* | 7/2021 | Wilson | A61C 7/002 |
| 2022/0296308 A1* | 9/2022 | Zagorchev | A61B 17/3468 |

OTHER PUBLICATIONS

Lyubomir et al., "Patient-Specific Sensor Registration for Electrical Source Imaging Using a Deformable Head Model", IEEE Transactions on Biomedical Engineering, vol. 68, No. 1, Jan. 2021, p. 267-275. (Year: 2021).*

* cited by examiner

AUTOMATIC, PATIENT-SPECIFIC TARGETING FOR DEEP BRAIN STIMULATION

TECHNICAL FIELD

The present disclosure relates generally to medical technologies, and more particularly, some examples relate to patient-specific targeting for deep brain stimulation.

BACKGROUND

Deep brain stimulation (DBS) involves placing leads/electrodes (i.e., DBS leads) within certain areas of a patient's brain. These DBS leads produce electrical pulses that can regulate abnormal impulses, affect cells within the brain, etc. A common target for DBS is the globus pallidus internus (GPi), although other sub-nuclei/sub-cortical brain structures may be targeted as well.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
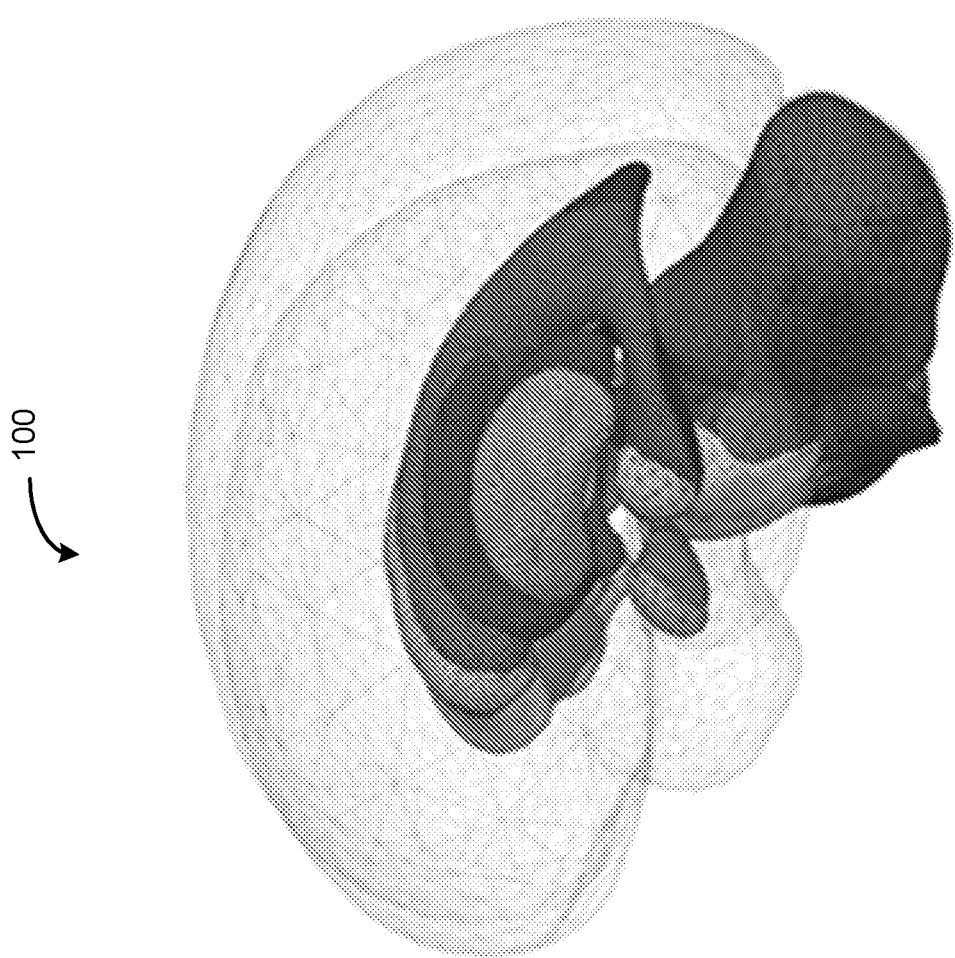
FIG. 1 depicts an example shape-constrained deformable cranial region model, in accordance with various examples of the presently disclosed technology.

The figures are not exhaustive and do not limit the present disclosure to the precise form disclosed.

DETAILED DESCRIPTION

Targeting brain structures for DBS procedures is typically done during pre-surgical planning. A traditional approach to targeting, sometimes referred to as "indirect targeting," involves registering/aligning patient data (e.g., a scan or scans of a patient's brain) to an atlas space (e.g., the Talaraich space) using referential anatomical landmarks such as the anterior commissure (AC), the posterior commissure (PC), and the sagittal plane midline. Known coordinates of DBS targets in the atlas space can then be used to estimate coordinates for DBS targets in the (aligned/registered) patient space.

In contrast to indirect targeting, many modern surgical techniques leverage "direct" targeting to directly visualize and identify DBS targets without alignment/comparison to an atlas space. Direct targeting techniques are generally more accurate/precise than indirect targeting techniques. However, there are certain drawbacks to direct targeting. For example, direct targeting typically relies on multiple images/scans of a patient's brain in order to identify DBS targets. In many cases, multi-modal images (i.e., images of different type/modality) are required for improved visualization of sub-cortical brain structures. Unfortunately, obtaining multiple images (and to a greater extent, multiple types of images) of a patient's brain can be labor intensive, time consuming, and expensive.

For example, in many clinical settings reserving the time required to obtain multiple brain images/scans can be difficult, especially where multiple machines are required (e.g., a magnetic resonance (MR) machine for obtaining (MR) scans, a computerized tomography (CT) machine for obtaining CT scans, a positron emission tomography machine (PET) for obtaining PET scans, etc.). In other cases, the machines required for obtaining multi-modal imaging may not be present at a clinical site. Notwithstanding the above-described scheduling/availability challenges, obtaining multiple brain images/scans can be expensive, and often requires valuable, and limited, time from skilled technicians/personnel. All of these challenges can limit the availability of direct targeting for DBS procedures.

Another drawback for direct targeting techniques that rely on multiple images of a patient's brain relates to the image alignment/registration required to implement these techniques. Such image alignment/registration (which in certain cases must be performed multiple times) can introduce additional inaccuracy to the targeting process, which can negatively impact pre-surgical planning for DBS procedures.

Against this backdrop, examples of the presently disclosed technology provide new systems and methods for performing direct targeting for DBS procedures (and other related procedures) using a single pre-operative scan of a patient's brain. Examples can achieve this single-scan direct targeting by leveraging mesh vertex-based correspondences between patient-specific 3D mesh brain structure representations across prospective and historical DBS procedures. As will be described in greater detail below, examples can leverage such correspondences to accurately predict DBS lead placement coordinates for a prospective DBS procedure based on historical DBS lead placement coordinates from the historical DBS procedures. Accordingly, a clinician performing the prospective DBS procedure can utilize the predicted DBS lead placement coordinates for surgical planning purposes. As alluded to above, this can all be done using a single scan of a patient's brain.

For example, based on a single scan of a patient's brain (e.g., an MR scan, a CT scan, etc.), examples can generate a patient-specific 3D mesh representation of a brain structure of the patient (i.e., a "present" patient-specific 3D mesh brain structure representation), the brain structure (e.g., the GPi) being targeted for a prospective DBS procedure. Generating the present patient-specific 3D mesh brain structure representation may comprise adapting a shape-constrained deformable cranial region model to the scan of the patient's brain, the shape-constrained deformable cranial region model comprising a computerized 3D mesh representation of a non-patient-specific human cranial region that preserves mesh vertex-based correspondences during mesh adaption to patient scans. As alluded to above (and as will be described in greater detail below), this same shape-constrained deformable cranial region model may have been adapted to patient scans from historical DBS procedures in order to generate patient-specific 3D mesh representations of corresponding brain structures (i.e., the "same" brain structure but in different patients) of the historical patients (i.e., "historical" patient-specific 3D mesh brain structure representations). Leveraging (1) mesh vertex-based correspondences between the present and historical patient-specific 3D mesh brain structure representations; and (2) determined spatial relationships between historical DBS lead placements and the historical patient-specific 3D mesh brain structure representations—examples can predict DBS lead placements for the prospective DBS procedure. As will be described below, examples can perform such predictions utilizing (a) a "closest mesh vertex subset"-based approach; and (b) an "average spatial offset"-based approach.

Overview of the "Closest Mesh Vertex Subset"-Based Approach

In certain implementations, examples can determine a subset of at least one mesh vertex (i.e., a "present" closest mesh vertex subset) of the present patient-specific 3D mesh brain structure representation located in closest proximity to historical DBS lead placements from historical DBS procedures. This may involve determining the present closest mesh vertex subset based on historical closest mesh vertex subsets (similarly) determined for the historical DBS procedures. In other words, for a given historical DBS procedure, examples can (i) adapt the shape-constrained deformable cranial region model to a scan of a given historical patient's brain to generate a given patient-specific 3D mesh representation of a corresponding brain structure of the historical patient (i.e., a given historical patient-specific 3D mesh brain structure representation); and (ii) determine a subset of at least one mesh vertex (i.e., a given historical closest mesh vertex subset) of the given historical patient-specific 3D mesh brain structure representation located in closest proximity to DBS lead placement coordinates (i.e., coordinates of where an actual DBS lead was placed in the historical DBS procedure) for the given historical DBS procedure. Examples may perform the same/similar determination for each historical DBS procedure. From these historical closest mesh vertex subsets, examples can then determine the present closest mesh vertex subset for the prospective DBS procedure. For instance, examples may select the three mesh vertices most common among the historical closest mesh vertex subsets. As alluded to above, these three mesh vertices may correspond (i.e., may be the "same" mesh vertices) across prospective and historical DBS procedures/patients because the present and historical patient-specific 3D mesh brain structure representations are adapted from the same shape-constrained deformable cranial region model that preserves mesh vertex-based correspondences during mesh adaption to patient scans.

Upon determining the present closest mesh vertex subset (i.e., the subset of at least one mesh vertex of the present patient-specific 3D mesh brain structure representation located in closest proximity to historical DBS lead placements from historical DBS procedures), examples can predict DBS lead placement coordinates for the prospective DBS procedure based on the present closest mesh vertex subset. In certain implementations, this may comprise: (a) computing center of mass coordinates for the present closest mesh vertex subset; and (b) predicting the DBS lead placement coordinates for the prospective DBS procedure as the computed center of mass coordinates for the present closest mesh vertex subset. In other implementations, examples can predict DBS lead placement coordinates for the prospective DBS procedure by: (a) determining a plane defined by the present closest mesh vertex subset; and (b) predicting the DBS lead placement coordinates for the prospective DBS procedure as a point along a normal of the determined plane. Upon predicting the DBS lead placement coordinates for the prospective DBS procedure by either technique, examples can provide the prediction to a user, who may use the prediction for surgical planning purposes.

Overview of the "Average Spatial Offset"-Based Approach

Another approach for predicting DBS lead placements for the prospective DBS procedure is the presently disclosed "average spatial offset"-based approach. The "average spatial offset"-based approach may involve: (a) computing center of mass coordinates for the brain structure based on coordinates of mesh vertices of the present patient-specific 3D mesh brain structure representation (here computing the center of mass coordinates for the brain structure based on coordinates of mesh vertices of the present patient-specific 3D mesh brain structure representation may comprise averaging coordinates of all mesh vertices located on a boundary surface of the present patient-specific 3D mesh brain structure representation); (b) determining an average spatial offset between center of mass coordinates for the (historical) corresponding brain structures and DBS lead placement coordinates from the historical DBS procedures; and (c) predicting DBS lead placement coordinates for the prospective DBS procedure based on the computed center of mass coordinates for the brain structure and the determined average spatial offset. Upon predicting the DBS lead placement coordinates for the prospective DBS procedure, examples can then provide the prediction to a user, who may use the prediction for surgical planning purposes.

In implementing this technique, examples again leverage the mesh vertex-based correspondences between the present and historical patient-specific 3D mesh brain structure representations. For instance, examples can determine a spatial offset for a given historical DBS procedure by: (i) adapting the shape-constrained deformable cranial region model to a scan of a given historical patient's brain to generate a given patient-specific 3D mesh representation of a corresponding brain structure of the historical patient (i.e., a given historical patient-specific 3D mesh brain structure representation); (ii) computing center of mass coordinates for the given corresponding brain structure based on coordinates of mesh vertices of the given historical patient-specific 3D mesh brain structure representation; and (iii) computing a historical spatial offset between the computed center of mass coordinates for the given corresponding brain structure and DBS lead placement coordinates from the given historical DBS procedure (i.e., coordinates of where a DBS lead was placed in the historical DBS procedure). Examples can perform the same/similar operations for each historical DBS procedure. Accordingly, examples can compute the average spatial offset between center of mass coordinates for the (historical) corresponding brain structures and DBS lead placement coordinates from the historical DBS procedures. Here it should be understood that computed center of mass coordinates for the brain structure and the (historical) corresponding brain structures are being used effectively as "anchor points" to relate the prospective/present DBS procedure to the historical DBS procedures. In other words, because each patient's image space is different, actual DBS lead placement coordinates obtained from the historical DBS procedures cannot simply be generalized to the prospective DBS procedure for the (present) patient having a different image space (this same reasoning explains why actual historical DBS lead placement coordinates from the "closest mesh vertex subset"-based approach are not used directly to determine the present closest mesh vertex subset). However, as examples of the presently disclosed technology are designed in appreciation of, spatial offsets between center of mass coordinates of the brain structure/corresponding brain structures and prospective/historical DBS lead placement coordinates will generally be preserved. Accordingly, by computing center of mass coordinates for the brain structure/corresponding brain structures in a consistent and accurate way (i.e., by leveraging the present and historical patient-specific 3D mesh brain structure representations), examples can determine spatial offsets for the historical DBS procedures that can be generalized to the prospective DBS procedure.

Examples of the presently disclosed technology provide numerous advantages over existing DBS targeting technologies. For instance, examples of the presently disclosed technology may be more accurate/precise than indirect targeting techniques that require alignment/comparison to an atlas space. Moreover, because examples of the presently disclosed technology only require a single scan of a patient's brain, examples may be less labor intensive, time consuming, and expensive than existing direct targeting techniques that require multiple images/scans of a patient's brain (and in some cases, images/scans of different type/modality) in order to identify DBS targets. Accordingly, examples of the presently disclosed technology may improve availability/accessibility for DBS procedures, which can improve the lives of prospective patients, etc.

FIG. 1 depicts an example shape-constrained deformable cranial region model 100, in accordance with various examples of the presently disclosed technology. Shape-constrained deformable cranial region model 100 may be a computerized 3D mesh representation of a generalized human cranial region (i.e., a non-patient-specific 3D representation of the human scalp, skull, brain, etc.) that preserves mesh vertex-based correspondences during mesh adaption to patient-specific data/scans using shape-constrained deformation. Shape-constrained deformable cranial region model 100 can be derived as an average/mean mesh from a set of training data.

As depicted, shape-constrained deformable cranial region model 100 comprises mesh elements and mesh vertices at the junctions of adjoining/adjacent mesh elements. Each mesh element of shape-constrained deformable cranial region model 100 may represent a different brain region. In the specific example of FIG. 1, the mesh elements of shape-constrained deformable cranial region model 100 comprise triangles, but in other examples mesh elements may comprise different shapes.

In general, a mesh may refer to a representation of a larger domain (e.g., a volume or surface) comprised of smaller discrete cells called mesh elements, and mesh vertices at the junctions of adjacent/adjoining mesh elements. Meshes can be used to compute solutions to equations across individual mesh elements, which then can be used to approximate solutions over the larger domain. For example (and as alluded to above), meshes can be used to compute center of mass coordinates for a structure (e.g., a brain structure such as a GPi) they represent.

As depicted (and as will be discussed below), shape-constrained deformable cranial region model 100 may comprise individual 3D segments/sub-representations representing various structures of the brain (e.g., sub-cortical structures such as the globus pallidus, the global pallidus internus (GPi), the putamen, thalamus, etc.).

Figure 2:
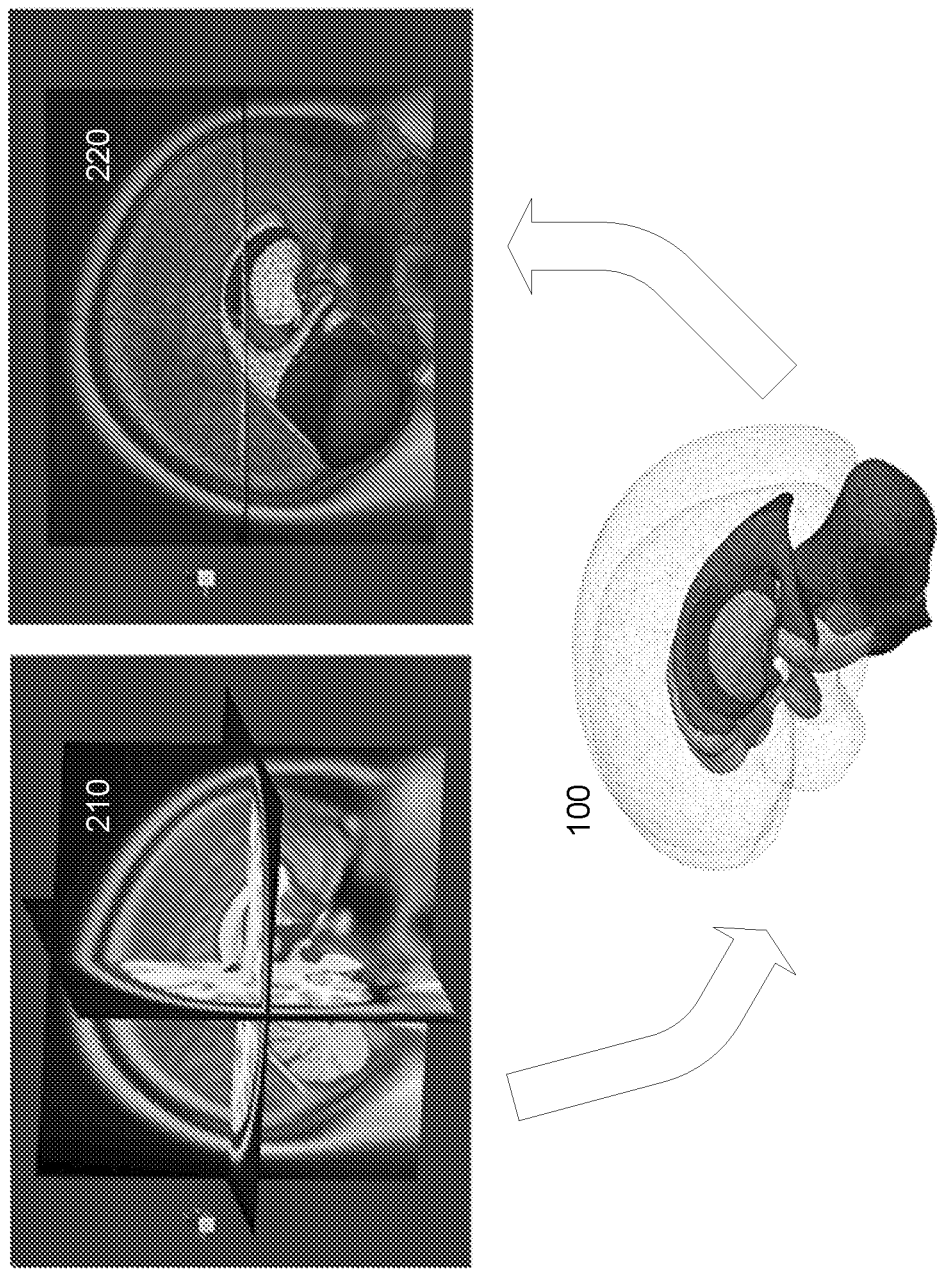
FIG. 2 depicts an example adaption of a shape-constrained deformable cranial region model to a scan of a patient's brain to generate a patient-specific 3D mesh brain representation, in accordance with examples of the presently disclosed technology.

FIG. 2 depicts an example adaption of shape-constrained deformable cranial region model 100 to a scan 210 of a patient's brain to generate a patient-specific 3D mesh brain representation 220, in accordance with examples of the presently disclosed technology.

As alluded to above, shape-constrained deformable cranial region model 100 can be adapted to scans of present and historical patients (e.g., MR scans, CT scans, PET scans, etc.) to generate patient-specific 3D brain representations. As depicted in FIG. 2, each patient-specific 3D brain representation may comprise individual 3D mesh sub-representations/segments representing individual brain structures of the patient (e.g., a patient-specific 3D mesh brain structure representation representing a patient's GPi). Importantly (and as alluded to above), examples can achieve this adaption with just a single scan of a given patient's brain. Accordingly, examples of the presently disclosed technology can provide systems/methods for DBS targeting which are cheaper, less time consuming, and less labor intensive than existing DBS targeting techniques (i.e., other direct targeting techniques) which require obtaining/analyzing multiple scans of a patient's brain.

As described above, shape-constrained deformable cranial region model 100 may be a computerized 3D mesh representation of a generalized human cranial region (i.e., a non-patient-specific 3D representation of the human scalp, skull, brain, etc.) that preserves mesh vertex-based correspondences during mesh adaption to patient-specific data/scans using shape-constrained deformation. Shape-constrained deformation may constrain deformation to an apriori derived mean mesh (i.e., shape-constrained deformable cranial region model 100). The shape-constrained deformation can use a penalty term estimated from the mean mesh (i.e., estimated from shape-constrained deformable cranial region model 100) that prevents topological changes during mesh adaptation, which may be an iterative process. Segmentation (i.e., generation of individual/segmented patient-specific 3D mesh brain structure representations such as a patient-specific 3D mesh brain structure brain representation representing the GPi) may gradually deform the mean mesh (i.e., gradually deform shape-constrained deformable cranial region model 100) to match the patient-specific scan/image. In other words, shape may be constrained to the mean mesh (i.e., constrained to shape-constrained deformable cranial region model 100), which can grow or shrink without morphing into a different shape.

Through the above-described adaptation, mesh vertex-based correspondences can be preserved between mesh vertices of shape-constrained deformable cranial region model 100 and mesh vertices of the (present and historical) patient-specific 3D mesh brain structure representations generated from shape-constrained deformable cranial region model 100. In other words, correspondences between mesh vertices of a present patient-specific 3D mesh brain structure representation and mesh vertices of historical patient-specific 3D mesh brain structure representations may be a property/function of the shape-constrained deformation process used to generate them, which adapts a mean mesh (i.e., shape-constrained deformable cranial region model 100) to patient specific image/scan data.

As alluded to above (and as will be described in greater detail below), examples can predict DBS lead placements for a prospective DBS procedure by leveraging (1) mesh vertex-based correspondences between a present patient-specific 3D mesh brain structure representation (associated with the prospective DBS procedure) and historical patient-specific 3D mesh brain structure representations (associated with historical DBS procedures); and (2) determined spatial relationships between historical DBS lead placements (associated with the historical DBS procedures) and the historical patient-specific 3D mesh brain structure representations.

Figure 3:
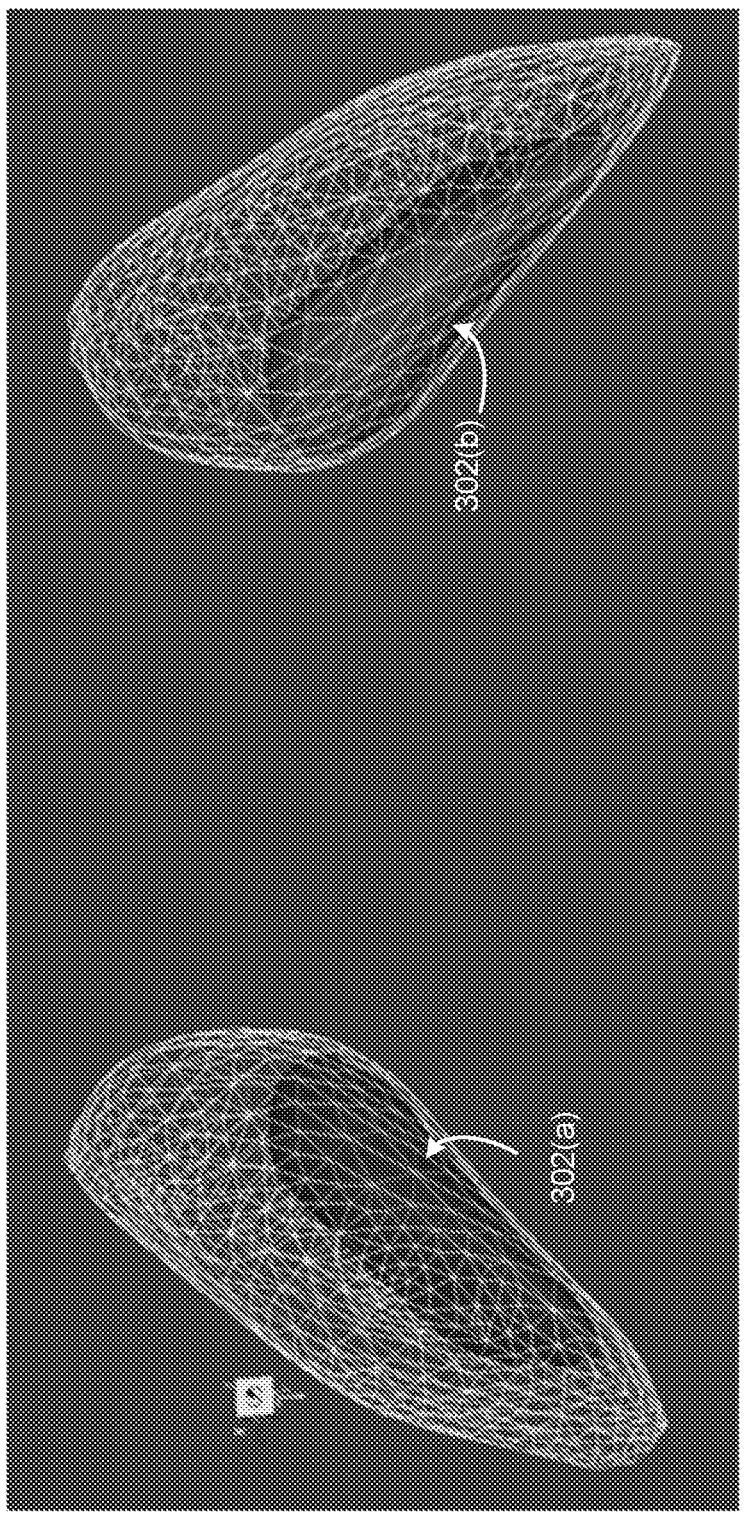
FIG. 3 depicts two example patient-specific 3D mesh brain structure representations, in accordance with examples of the presently disclosed technology.

FIG. 3 depicts example patient-specific 3D mesh brain structure representations 302(*a*) and 302(*b*), in accordance with examples of the presently disclosed technology. Here patient-specific 3D mesh brain structure representations 302(*a*) and 302(*b*) may be individual segments/sub-representations of patient-specific 3D mesh brain representation 220 and may represent the patient's right and left GPi lobes respectively. As alluded to above, the GPi (i.e., either or both lobes of the GPi), is a common target for DBS procedures, although other sub-nuclei/sub-cortical brain structures may be targeted as well.

Figure 4:
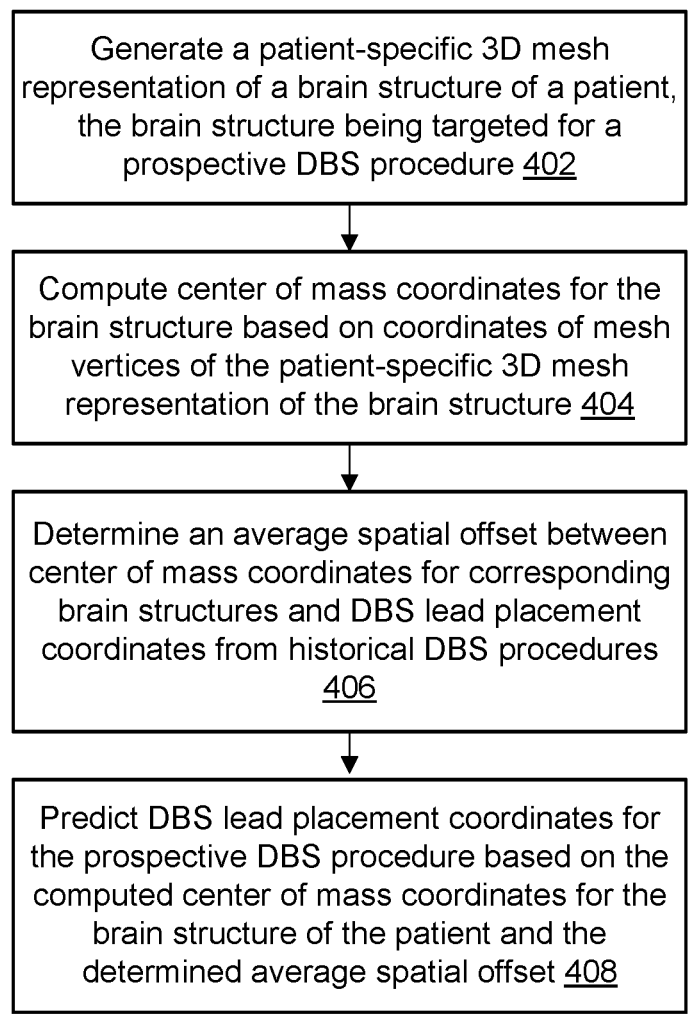
FIG. 4 depicts an example flow diagram that may be used to predict DBS lead placement coordinates for a prospective DBS procedure, in accordance with various examples of the presently disclosed technology.

FIG. 4 depicts an example flow diagram that may be used to predict DBS lead placement coordinates for a prospective DBS procedure, in accordance with various examples of the presently disclosed technology. This flow diagram may correspond to the "average spatial offset"-based approach described above.

At operation 402, examples generate a patient-specific 3D mesh representation of a brain structure of a patient (i.e., a "present" patient-specific 3D mesh brain structure representation) based on a scan of the patient's brain (e.g., an MR scan, a CT scan, etc.). The brain structure (e.g., the GPi) may be a brain structure of the patient being targeted for a prospective DBS procedure. Generating the present patient-specific 3D mesh brain structure representation may comprise adapting a shape-constrained deformable cranial region model (e.g., shape-constrained deformable cranial region model 100) to the scan of the patient's brain. As described above, the shape-constrained deformable cranial region model may comprise a computerized 3D mesh representation of a non-patient-specific human cranial region that preserves mesh vertex-based correspondences during mesh adaption to patient scans. As alluded to above (and as will be described in greater detail in conjunction with FIG. 5), this same shape-constrained deformable cranial region model may have been adapted to patient scans from historical DBS procedures in order to generate patient-specific 3D mesh representations of corresponding brain structures (e.g., GPis) of the historical patients (i.e., "historical" patient-specific 3D mesh brain structure representations).

At operation 404, examples compute center of mass coordinates for the brain structure based on coordinates of mesh vertices of the patient-specific 3D mesh representation of the brain structure. In certain instances, this may comprise averaging coordinates of all mesh vertices located on a boundary surface of the patient-specific 3D mesh representation of the brain structure. An example computation for this is illustrated below where $\bar{x}, \bar{y}, \bar{z}$ are the 3D coordinates of the computed center of mass of n surface mesh vertices represented by $x_i, y_i, z_i$.

$$\bar{x} = (x_1 + x_2 + \cdots + x_n)/n$$
$$\bar{y} = (y_1 + y_2 + \cdots + y_n)/n$$
$$\bar{z} = (z_1 + z_2 + \cdots + z_n)/n$$

At operation 406, examples determine an average spatial offset between center of mass coordinates for corresponding brain structures and DBS lead placement coordinates from historical DBS procedures.

As will be described in greater detail in FIG. 5, examples may generate patient-specific 3D mesh representations of corresponding brain structures of the historical patients (i.e., "historical" patient-specific 3D mesh brain structure representations). Examples may then compute center of mass coordinates for the corresponding brain structures for the historical DBS procedures using the same/similar techniques (these computations may be performed contemporaneous with the respective historical DBS procedures or at later times). Examples may then compare associated center of mass coordinates to DBS lead placement coordinates (i.e., coordinates of where actual DBS leads were placed in the historical DBS procedures) in order to determine a spatial offset for each historical DBS procedure (this spatial offset will include x, y, and z coordinates). Here, a spatial offset for a given historical DBS procedure may measure a spatial offset for computed center of mass coordinates for a corresponding brain structure from the given historical DBS procedure and DBS lead placement coordinates from the given historical DBS procedure (i.e., coordinates of where an actual DBS lead was placed in the given historical DBS procedure). From the determined spatial offsets for the historical DBS procedures, examples can then compute an average (e.g., a mean, median, mode, etc.) spatial offset for the historical DBS procedures. An example computation for determining x, y, and z components of the average spatial offset (i.e., $d_x$, $d_y$, and $d_z$) is illustrated below where i, $\tilde{x}_i, \tilde{y}_i, \tilde{z}_i, \tilde{x}_i', \tilde{y}_i', \tilde{z}_i'$, are the center of mass coordinates of the corresponding brain structure and the DBS lead placement coordinates respectively from the i-th historical DBS procedure of n historical DBS procedures.

$$d_x = \frac{\sum_{i=0}^{n} (\tilde{x}_i - \tilde{x}_i')}{n};$$
$$d_y = \frac{\sum_{i=0}^{n} (\tilde{y}_i - \tilde{y}_i')}{n};$$
$$d_z = \frac{\sum_{i=0}^{n} (\tilde{z}_i - \tilde{z}_i')}{n}.$$

At operation 408, examples predict DBS lead placement coordinates for the prospective DBS procedure based on the computed center of mass coordinates for the brain structure of the patient and the determined average spatial offset. An example computation is illustrated below where (i) x, y, and z components of the average spatial offset are represented by $d_x, d_y,$ and $d_z$ respectively; (ii) $\bar{x}, \bar{y}, \bar{z}$ are the computed center of mass coordinates for the brain structure; and (iii) and $\hat{x}$, $\hat{y}$, and $\hat{z}$ are the predicted DBS lead placement coordinates.

$$\hat{x} = \bar{x} - d_x$$
$$\hat{y} = \bar{y} - d_y$$
$$\hat{z} = \bar{z} - d_z$$

In various instances, examples may provide the predicted DBS lead placement coordinates to a user (e.g., a neurosurgeon) for surgical planning purposes. For example, the predicted DBS lead placement coordinates may be displayed on a graphical user interface (GUI) in relationship to a representation of the patient's brain. In some cases, the coordinates may be provided to a surgical trajectory planning system planning a surgical trajectory for the prospective DBS procedure.

In certain examples, at least some (or in certain cases all) of the historical DBS procedures may include DBS procedures performed by a surgeon set to perform the prospective DBS procedure. In other words, the historical DBS procedures may be surgeon-specific, and the resulting DBS coordinate prediction for the prospective DBS procedure may be surgeon-specific as well. As examples of the presently disclosed technology are designed in appreciation of, many neurosurgeon's tend to select the same/similar location relative to a brain structure for placing a DBS lead (e.g., the posterior portion of a GPi lobe). Examples can leverage this continuity by making highly accurate surgeon-specific predictions that can be used for planning DBS procedures for particular neurosurgeons.

Figure 5:
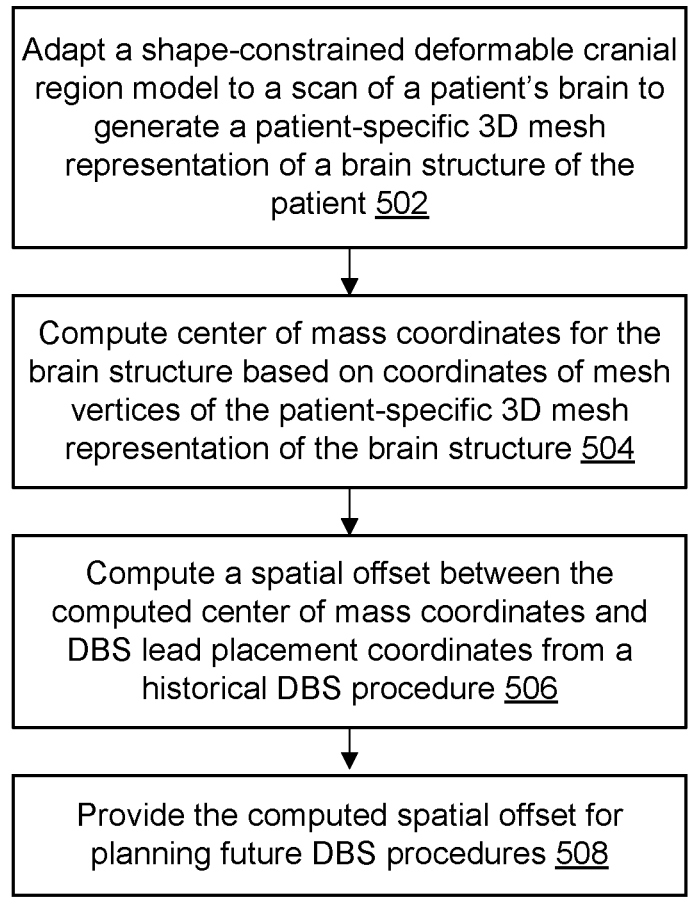
FIG. 5 depicts an example flow diagram that may be used to compute a spatial offset for a (historical) DBS procedure that may be used for planning future prospective DBS procedures, in accordance with various examples of the presently disclosed technology.

FIG. 5 depicts an example flow diagram that may be used to compute a spatial offset for a (historical) DBS procedure that may be used for planning future prospective DBS procedures, in accordance with various examples of the presently disclosed technology. Like the flow diagram from FIG. 4, this flow diagram may correspond to the "average spatial offset"-based approach described above.

At operation 502, examples adapt a shape-constrained deformable cranial region model (e.g., shape-constrained deformable cranial region model 100) to a scan of a patient's brain to generate a patient-specific 3D mesh representation of a brain structure of the patient. As described above, the shape-constrained deformable cranial region model may comprise a computerized 3D mesh representation of a non-patient-specific human cranial region that preserves mesh vertex-based correspondences during mesh adaption to patient scans. As alluded to above, this same shape-constrained deformable cranial region model may be adapted to patient scans from other (historical) DBS procedures to generate patient-specific 3D mesh representations of corresponding patient brain structures (i.e., the "same" brain structure but in the other patients) from the other historical DBS procedures. As described above (and as will be described below), examples can then leverage mesh vertex based correspondences across these other (historical) patient-specific 3D mesh brain structure representations and patient-specific 3D mesh brain structure representations generated for future/prospective DBS procedures to predict DBS lead placement coordinates for the future/prospective DBS procedures.

At operation 504, examples compute center of mass coordinates for the brain structure based on coordinates of mesh vertices of the patient-specific 3D mesh representation of the brain structure. This operation may be performed in the same/similar manner as described in conjunction with operation 404 of FIG. 4.

Here it should be understood that examples use the computed center of mass coordinates for the brain structure effectively as "anchor points" to relate the (historical) DBS procedure to future/prospective DBS procedures. In other words, because each patient's image space is different, actual DBS lead placement coordinates obtained from the (historical) DBS procedure cannot simply be generalized to a future/prospective DBS procedure for another patient having a different image space (this same reasoning explains why actual historical DBS lead placement coordinates from the "closest mesh vertex subset"-based approach are not used directly to determine the present closest mesh vertex subset). However, as examples of the presently disclosed technology are designed in appreciation of, spatial offsets between center of mass coordinates of the brain structure/corresponding brain structures and future/prospective DBS lead placement coordinates will generally be preserved. Accordingly, by computing center of mass coordinates for the brain structure/corresponding brain structures in a consistent and accurate way (i.e., by leveraging the patient-specific 3D mesh brain structure representations adapted from the same shape-constrained deformable cranial region model), examples can determine (historical) spatial offset(s) that are generalizable to future/prospective DBS procedures.

Accordingly, at operation 506, examples compute a spatial offset between the computed center of mass coordinates and DBS lead placement coordinates from the DBS procedure (i.e., coordinates of where a DBS lead was placed in the historical DBS procedure). Here the DBS lead placement coordinates can be obtained/determined using various techniques. For example, embodiments can record a DBS lead placement entry point and adjustments made during a DBS procedure to calculate the (final) DBS lead placement coordinates. As another example, DBS lead placement coordinates can be determined/identified using post-operative imaging (e.g., MR or CT scans collected after DBS electrodes have been implanted).

At operation 508, examples provide the computed spatial offset for planning future DBS procedures. Here, the computed spatial offset may be utilized as described in conjunction with FIG. 4.

As alluded to above, this same flow chart may be used to compute/provide spatial offsets from a number of (historical) DBS procedures. As described in conjunction with FIG. 4, these (historical) spatial offsets may be averaged and used to predict DBS lead placement coordinates for future/prospective DBS procedures.

Figure 6:
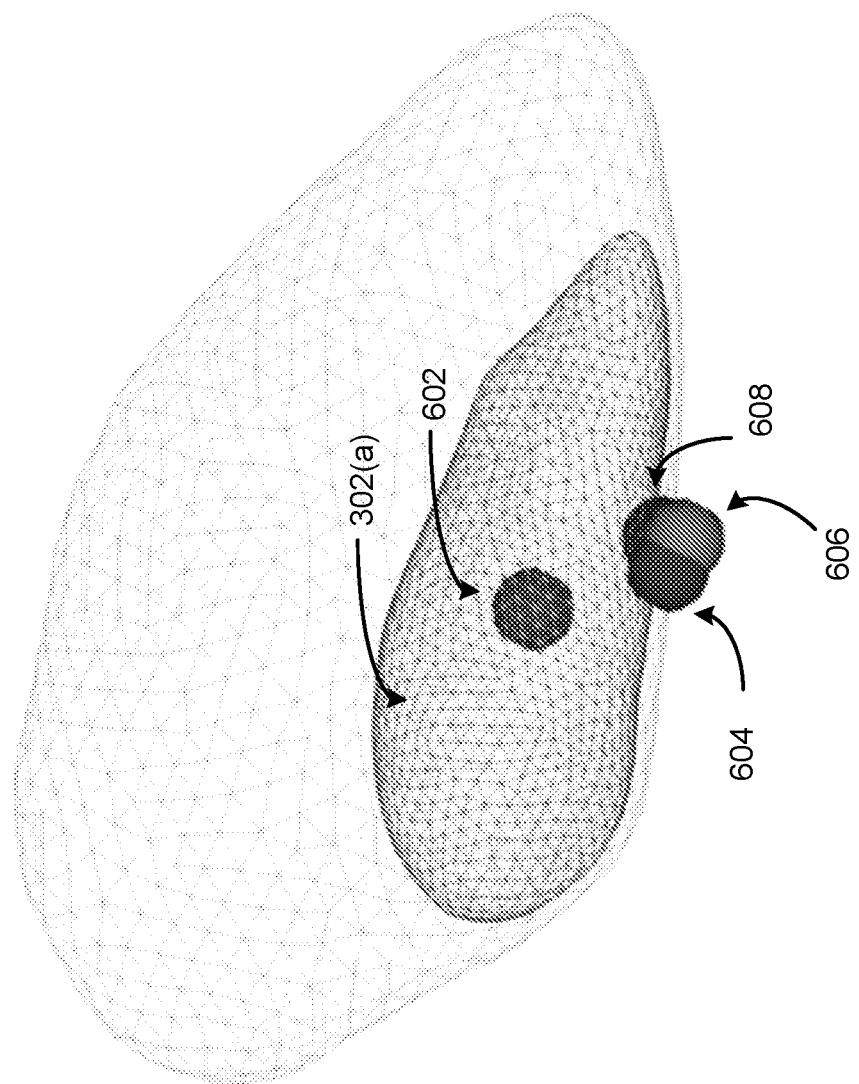
FIG. 6 depicts an example patient-specific 3D mesh brain structure representation and associated computed center of mass coordinates and predicted DBS lead placement coordinates, in accordance with examples of the presently disclosed technology.

FIG. 6 depicts an example patient-specific 3D mesh brain structure representation 302(a) and associated computed center of mass coordinates and predicted DBS lead placement coordinates, in accordance with examples of the presently disclosed technology. Here patient-specific 3D mesh brain structure representation 302(a) may be the same patient-specific 3D mesh brain structure representation 302(a) as depicted in the example of FIG. 3.

Referring again to FIG. 6, sphere 602 visually represents the computed center of mass coordinates for patient-specific 3D mesh brain structure representation 302(a). Sphere 604 visually represents predicted DBS lead placement coordinates for a DBS procedure. Here the center of mass coordinates for patient-specific 3D mesh brain structure representation 302(a) may have been computed using any of the techniques described in conjunction with FIGS. 4-5.

FIG. 6 also depicts actual DBS lead placement coordinates for the DBS procedure (visually depicted by sphere 608), and consensus/average coordinates (visually depicted by sphere 606)—the consensus/average coordinates representing a consensus/average between the actual DBS lead placement coordinates and the predicted DBS lead placement coordinates. Determining/obtaining these values (i.e., the actual DBS lead placement coordinates and the consensus/average coordinates) can help to validate and improve examples of the presently disclosed technology. For instance, examples can utilize comparisons between predicted DBS lead placement coordinates and actual DBS lead placement coordinates to refine future predictions, train a machine learning model tasked with predicted DBS lead placement coordinates, etc.

Figure 7:
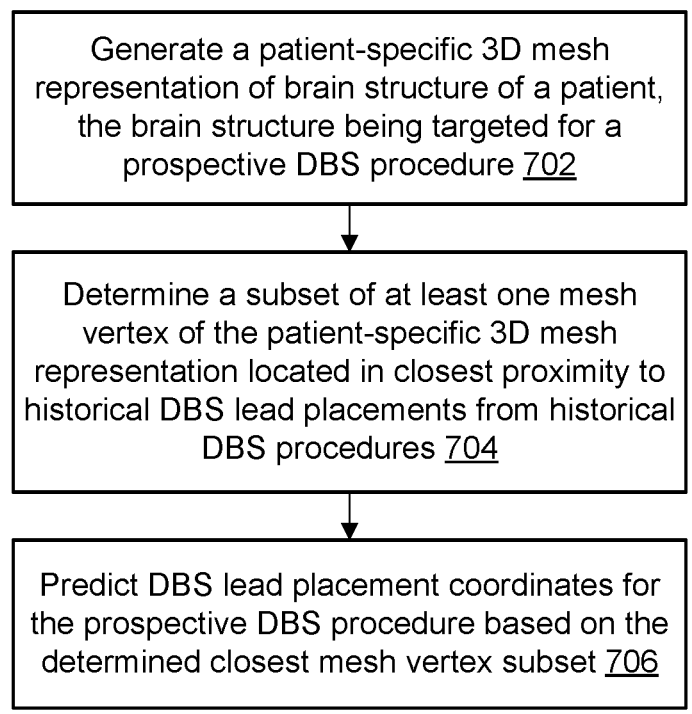
FIG. 7 depicts an example flow diagram that may be used to predict DBS lead placement coordinates for a prospective DBS procedure, in accordance with various examples of the presently disclosed technology.

FIG. 7 depicts an example flow diagram that may be used to predict DBS lead placement coordinates for a prospective DBS procedure, in accordance with various examples of the presently disclosed technology. This flow diagram may correspond to the "closest mesh vertex"-based approach described above.

At operation 702, examples generate a patient-specific 3D mesh representation of a brain structure of a patient (i.e., a "present" patient-specific 3D mesh brain structure representation) based on a scan of the patient's brain (e.g., an MR scan, a CT scan, etc.). The brain structure (e.g., the GPi) may be a brain structure of the patient being targeted for a prospective DBS procedure. This operation may be performed in the same/similar manner as described in conjunction with operation 402 of FIG. 4.

At operation 704, examples determine a subset of at least one mesh vertex (i.e., a "present" closest mesh vertex subset) of the patient-specific 3D mesh representation located in closest proximity to historical DBS lead placements from historical DBS procedures. This may involve determining the present closest mesh vertex subset based on historical closest mesh vertex subsets (similarly) determined for the historical DBS procedures. In other words, for a given historical DBS procedure, examples can (i) adapt the shape-constrained deformable cranial region model to a scan of a given historical patient's brain to generate a given patient-specific 3D mesh representation of a corresponding brain structure of the historical patient (i.e., a given historical patient-specific 3D mesh brain structure representation); and (ii) determine a subset of at least one mesh vertex (i.e., a given historical closest mesh vertex subset) of the given historical patient-specific 3D mesh brain structure representation located in closest proximity to DBS lead placement coordinates (i.e., coordinates of where an actual DBS lead was placed in the historical DBS procedure) for the given historical DBS procedure. Examples may perform the same/similar determination for each historical DBS procedure. From these historical closest mesh vertex subsets, examples can then determine the present closest mesh vertex subset for the prospective DBS procedure. For instance, examples may select the three mesh vertices most common among the historical closest mesh vertex subsets. As alluded to above, these three mesh vertices may correspond (i.e., may be the "same" mesh vertices) cross prospective and historical DBS procedures/patients because the present and historical patient-specific 3D mesh brain structure representations are adapted from the same shape-constrained deformable cranial region model that preserves mesh vertex-based correspondences during mesh adaption to patient scans.

A related example of pseudocode that may be used to determine the "present" closest mesh vertex subset is illustrated below:

```
D_total = [ ];
D_case = [ ];
n = 3; % n can be specified by a user and in this case represents
top 3 vertices that are closest to their corresponding final DBS
lead target and that are chosen from a set of sorted indices
detailed by the algorithm below.
For each historical DBS procedure,
    for each mesh vertex v
        compute distance d between v and final DBS lead
        placement t
        D_historical DBS procedure.append([d, index of v])
        D_historical DBS procedure.sort( )
    D_total.append(D_historical DBS procedure)
Find unique elements of the index in D_total and their
corresponding frequencies and locations in the array.
Sort unique indices based on their frequencies to find the top n
closest vertices corresponding to the top n unique indices.
```

At operation 706, examples predict DBS lead placement coordinates for the prospective DBS procedure based on the determined closest mesh vertex subset. In certain implementations, this may comprise: (a) computing center of mass coordinates for the present closest mesh vertex subset; and (b) predicting the DBS lead placement coordinates for the prospective DBS procedure as the computed center of mass coordinates for the present closest mesh vertex subset. In other implementations, examples can predict DBS lead placement coordinates for the prospective DBS procedure by: (a) determining a plane defined by the present closest mesh vertex subset; and (b) predicting the DBS lead placement coordinates for the prospective DBS procedure as a point along a normal of the determined plane. Upon predicting the DBS lead placement coordinates for the prospective DBS procedure by either technique, examples can provide the prediction to a user, who may use the prediction for surgical planning purposes.

Figure 8:
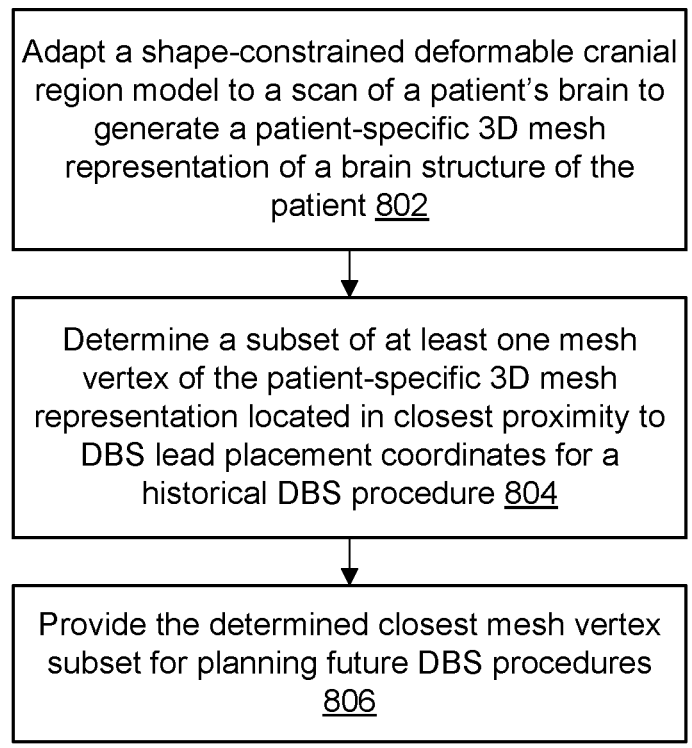
FIG. 8 depicts an example flow diagram that may be used to determine a closest mesh vertex subset for a (historical) DBS procedure that may be used for planning future prospective DBS procedures, in accordance with various examples of the presently disclosed technology.

FIG. 8 depicts an example flow diagram that may be used to determine a closest mesh vertex subset for a (historical) DBS procedure that may be used for planning future prospective DBS procedures, in accordance with various examples of the presently disclosed technology. Like the flow diagram from FIG. 7, this flow diagram may correspond to the "closest mesh vertex subset"-based approach described above.

At operation 802, examples adapt a shape-constrained deformable cranial region model to a scan of a patient's brain to generate a patient-specific 3D mesh representation of a brain structure of the patient. This operation may be performed in the same/similar manner as described in conjunction with operation 402 of FIG. 4.

As alluded to above, this same shape-constrained deformable cranial region model may be adapted to patient scans from other (historical) DBS procedures to generate patient-specific 3D mesh representations of corresponding patient brain structures (i.e., the "same" brain structure but in the other patients) from the other historical DBS procedures. As described above (and as will be described below), examples can then leverage mesh vertex based correspondences across these other (historical) patient-specific 3D mesh brain structure representations and patient-specific 3D mesh brain structure representations generated for future/prospective DBS procedures to predict DBS lead placement coordinates for the future/prospective DBS procedures.

At operation 804, examples determine a subset of at least one mesh vertex (i.e., a closest mesh vertex subset) of the patient-specific 3D mesh representation located in closest proximity to DBS lead placement coordinates for the DBS procedure (i.e., coordinates of where an actual DBS lead was placed in the DBS procedure). One example of how to determine the closest mesh vertex subset is illustrated by the pseudocode above. In particular, distances from each mesh vertex to the (actual) DBS lead placement coordinates may be calculated and sorted. Based on the shortest distances collected from the historical DBS procedures, the closest mesh vertices that are most common among the historical DBS procedures can be determined. Depending on a user's preference, the closest mesh vertex subset can be a single mesh vertex, multiple mesh vertices, or an average of multiple mesh vertices.

At operation 806, examples provide the determined (historical) closest mesh vertex subset for planning future DBS procedures.

Figure 9:
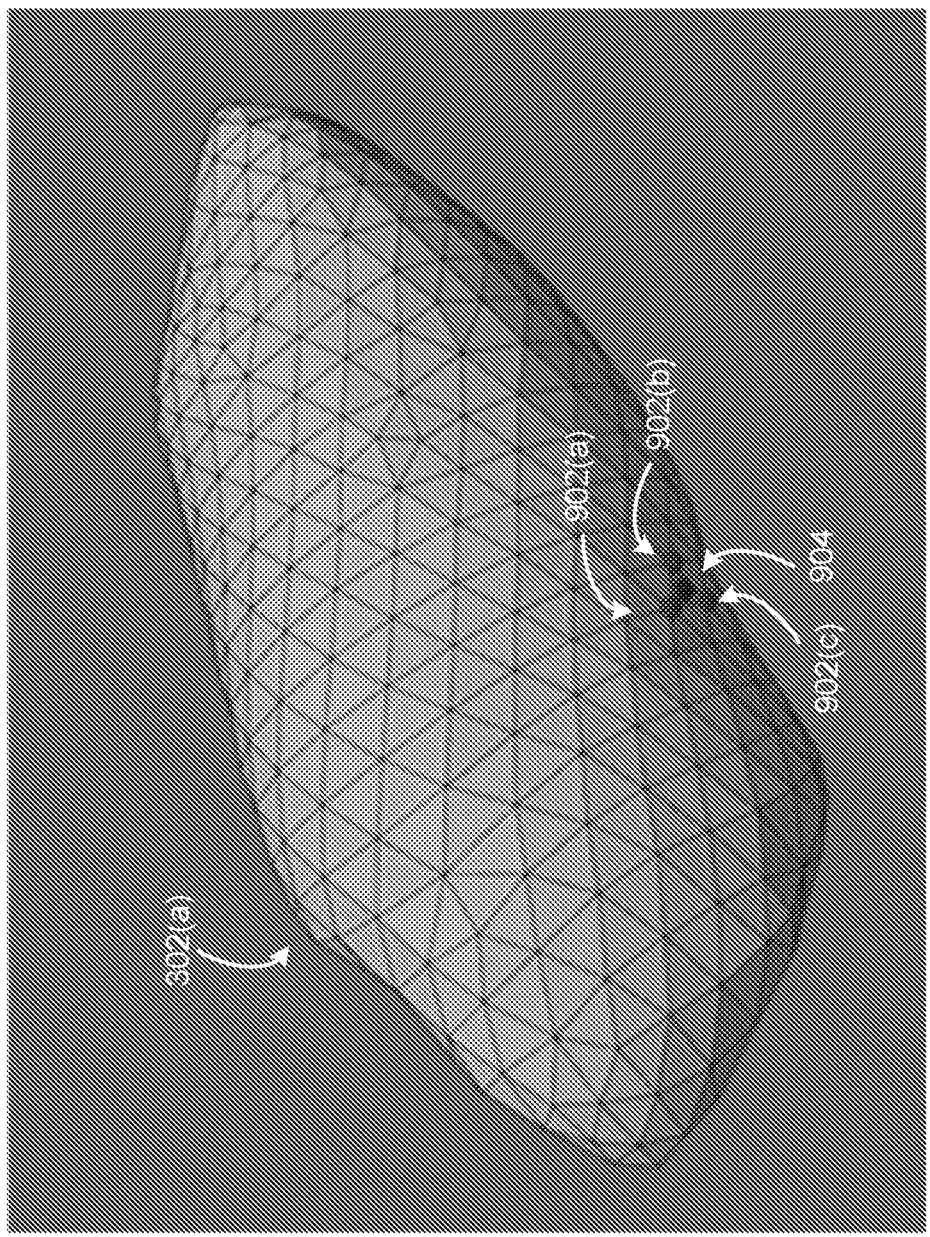
FIG. 9 depicts an example patient-specific 3D mesh brain structure representation and an associated determined closest mesh vertex subset, in accordance with examples of the presently disclosed technology.

FIG. 9 depicts an example patient-specific 3D mesh brain structure representation 302(*a*) and an associated determined closest mesh vertex subset, in accordance with examples of the presently disclosed technology. Here patient-specific 3D mesh brain structure representation 302 (*a*) may be the same patient-specific 3D mesh brain structure representation 302(*a*) as depicted in the example of FIG. 3.

Referring again to FIG. 9, sphere 902(*a*) visually represents a first mesh vertex of the determined closest mesh vertex subset, sphere 902(*b*) visually represents a second mesh vertex of the determined closest mesh vertex subset, and sphere 902(*c*) visually represents a second mesh vertex of the determined closest mesh vertex subset. While only three mesh vertices are depicted in the example closest mesh vertex subset of FIG. 9, in other examples the determined closest mesh vertex subset may comprise any number of mesh vertices (e.g., 1, 2, 3, 4, 5, 6 . . . etc.). Here, the determined closest mesh vertex subset may have been computed using any of the techniques described in conjunction with FIGS. 7 and 8.

FIG. 9 also depicts predicted DBS lead placement coordinates (visually represented by sphere 904) for a prospective DBS procedure based on the determined closest mesh vertex subset. The predicted DBS lead placement coordinates may have been predicted using any of the techniques described in conjunction with FIG. 7.

Figure 10:
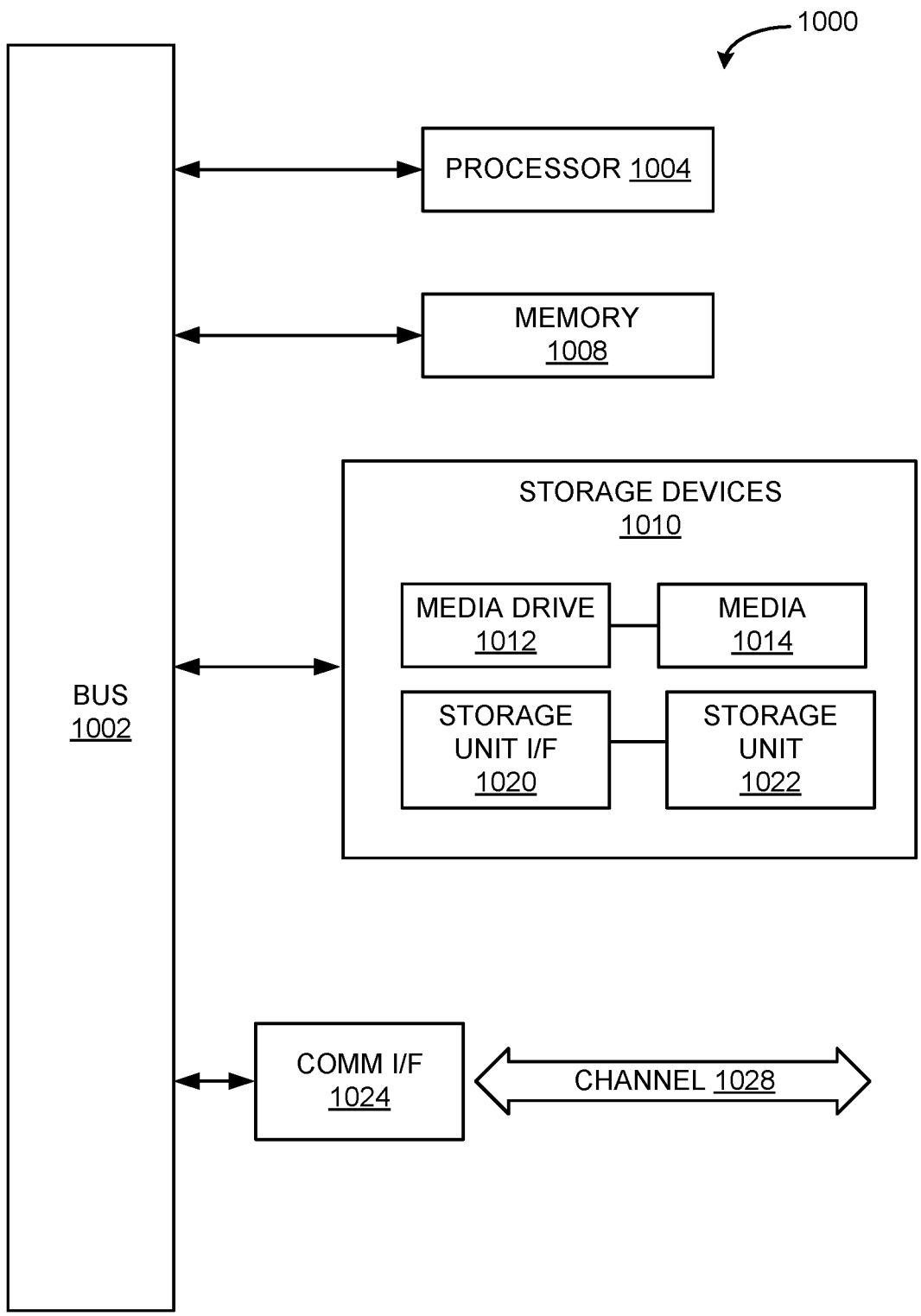
FIG. 10 is an example computing component that may be used to implement various features of examples described in the present disclosure.

As used herein, the terms circuit and component might describe a given unit of functionality that can be performed in accordance with one or more examples of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 10. Various examples are described in terms of this example-computing component 1000. After reading this description, it will become apparent to a person skilled in the relevant art how to implement the application using other computing components or architectures.

Referring now to FIG. 10, computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. For example, random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, a compact disc (CD) or digital video disc (DVD) drive (R or RW), or other removable or fixed media drive might be provided. Storage media 1014 might include, for example, a hard disk, an integrated circuit assembly, magnetic tape, cartridge, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative examples, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot. Other examples may include a PCMCIA slot and card, and other fixed or removable storage units 1022 and interfaces 1020 that allow software and data to be transferred from storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

The invention claimed is:

1. A method, comprising:
adapting a shape-constrained deformable cranial region model to a scan of a patient's brain, to generate a patient-specific three-dimensional (3D) mesh representation of a brain structure of the patient, the brain structure being targeted for a prospective deep brain stimulation (DBS) procedure and the shape-constrained deformable cranial region model comprising a computerized 3D mesh representation of a non-patient-specific human cranial region that preserves mesh vertex-based correspondences during mesh adaption to patient scans;
computing center of mass coordinates for the brain structure based on coordinates of mesh vertices of the patient-specific 3D mesh representation of the brain structure;
determining an average spatial offset between center of mass coordinates for corresponding brain structures and DBS lead placement coordinates from historical DBS procedures;
predicting DBS lead placement coordinates for the prospective DBS procedure based on the computed center of mass coordinates for the brain structure of the patient and the determined average spatial offset; and
displaying, on a graphical user interface (GUI), the predicted DBS lead placement coordinates in relationship to a representation of the patient's brain.

2. The method of claim 1, further comprising providing the predicted DBS lead placement coordinates to a surgical planning system.

3. The method of claim 1, wherein the historical DBS procedures include historical DBS procedures performed by a surgeon set to perform the prospective DBS procedure.

4. The method of claim 1, wherein computing the center of mass coordinates for the brain structure based on coordinates of mesh vertices of the patient-specific 3D mesh representation of the brain structure comprises:

averaging coordinates of all mesh vertices located on a boundary surface of the patient-specific 3D mesh representation of the brain structure.

5. The method of claim 1, wherein the scan of the patient's brain is a pre-operative magnetic resonance (MR) scan or a pre-operative computerized tomography (CT) scan.

6. The method of claim 1, wherein displaying, on the GUI, the predicted DBS lead placement coordinates in relationship to the representation of the patient's brain comprises at least one of:
displaying, on the GUI, the predicted DBS lead placement coordinates in relationship to the patient-specific 3D mesh representation of the brain structure; or
displaying, on the GUI, the predicted DBS lead placement coordinates in relationship to the scan of the brain structure.

7. A system comprising:
one or more processing resources; and
a non-transitory computer-readable medium, coupled to the one or more processing resources, having stored therein instructions that when executed by the one or more processing resources cause the system to perform a method comprising:
adapting a shape-constrained deformable cranial region model to a scan of a patient's brain to generate a patient-specific three-dimensional (3D) mesh representation of a brain structure of the patient, the shape-constrained deformable cranial region model comprising a computerized 3D mesh representation of a non-patient-specific human cranial region that preserves mesh vertex-based correspondences during mesh adaption to patient scans, the brain structure targeted for a prospective deep brain stimulation (DBS) procedure;
computing center of mass coordinates for the brain structure based on coordinates of mesh vertices of the patient-specific 3D mesh representation of the brain structure;
determining an average spatial offset between center of mass coordinates for corresponding brain structures and DBS lead placement coordinates from historical DBS procedures;
predicting DBS lead placement coordinates for the prospective DBS procedure based on the computed center of mass coordinates for the brain structure of the patient and the determined average spatial offset; and
displaying, on a graphical user interface (GUI), the predicted DBS lead placement coordinates in relationship to the patient-specific 3D mesh representation.

8. The system of claim 7, wherein computing the center of mass coordinates for the brain structure based on coordinates of mesh vertices of the patient-specific 3D mesh representation of the brain structure comprises:
averaging coordinates of all mesh vertices located on a boundary surface of the patient-specific 3D mesh representation of the brain structure.

9. The system of claim 7, wherein the scan of the patient's brain is a pre-operative magnetic resonance (MR) scan or a pre-operative computerized tomography (CT) scan.

10. A non-transitory computer-readable storage medium including instructions that, when executed by at least one processor of a computing system, cause the computing system to perform a method comprising:
adapting a shape-constrained deformable cranial region model to a scan of a patient's brain to generate a patient-specific three-dimensional (3D) mesh representation of a brain structure of the patient, the brain structure being targeted for a prospective deep brain stimulation (DBS) procedure and the shape-constrained deformable cranial region model comprising a computerized 3D mesh representation of a non-patient-specific human cranial region that preserves mesh vertex-based correspondences during mesh adaption to patient scans;
determining a closest mesh vertex subset comprising a subset of at least one mesh vertex of the patient-specific 3D mesh representation of the brain structure located in closest proximity to historical DBS lead placement coordinates from historical DBS procedures;
predicting DBS lead placement coordinates for the prospective DBS procedure based on the determined closest mesh vertex subset; and
displaying, on a graphical user interface (GUI), the predicted DBS lead placement coordinates in relationship to a representation of the patient's brain.

11. The non-transitory computer-readable medium of claim 10, wherein determining the closest mesh vertex subset comprises:
determining the closest mesh vertex subset based on historical closest mesh vertex subsets determined for the historical DBS procedures.

12. The non-transitory computer-readable medium of claim 10, wherein predicting the DBS lead placement coordinates for the prospective DBS procedure based on the determined closest mesh vertex subset comprises:
computing center of mass coordinates for the determined closest mesh vertex subset; and
predicting the DBS lead placement coordinates for the prospective DBS procedure as the computed center of mass coordinates.

13. The non-transitory computer-readable medium of claim 10, wherein predicting the DBS lead placement coordinates for the prospective DBS procedure based on the determined closest mesh vertex subset comprises:
determining a plane defined by the determined closest mesh vertex subset; and
predicting the DBS lead placement coordinates for the prospective DBS procedure as a point along a normal of the determined plane.

14. The non-transitory computer-readable medium of claim 10, further comprising providing the predicted DBS lead placement coordinates to a surgical planning system.

15. The non-transitory computer-readable medium of claim 10, wherein the scan of the patient's brain is a pre-operative magnetic resonance (MR) scan or a pre-operative computerized tomography (CT) scan.

16. The non-transitory computer-readable medium of claim 10, wherein displaying, on the GUI, the predicted DBS lead placement coordinates in relationship to the representation of the patient's brain comprises at least one of:
displaying, on the GUI, the predicted DBS lead placement coordinates in relationship to the patient-specific 3D mesh representation of the brain structure; or
displaying, on the GUI, the predicted DBS lead placement coordinates in relationship to the scan of the brain structure.

17. A system comprising:
one or more processing resources; and
a non-transitory computer-readable medium, coupled to the one or more processing resources, having stored therein instructions that when executed by the one or more processing resources cause the system to perform a method comprising:

adapting a shape-constrained deformable cranial region model to a scan of a patient's brain to generate a patient-specific three-dimensional (3D) mesh representation of a brain structure of the patient, the shape-constrained deformable cranial region model comprising a computerized 3D mesh representation of a non-patient-specific human cranial region that preserves mesh vertex-based correspondences during mesh adaption to patient scans, the brain structure of the patient being targeted for a prospective deep brain stimulation (DBS) procedure;

determining a closest mesh vertex subset comprising a subset of at least one mesh vertex of the patient-specific 3D mesh representation of the brain structure located in closest proximity to historical DBS lead placement coordinates from historical DBS procedures;

predicting DBS lead placement coordinates for the prospective DBS procedure based on the determined closest mesh vertex subset; and displaying, on a graphical user interface (GUI), the predicted DBS lead placement coordinates in relationship to a representation of the patient's brain.

18. The system of claim 17, wherein the scan of the patient's brain is a pre-operative magnetic resonance (MR) scan or a pre-operative computerized tomography (CT) scan.

19. The system of claim 17, wherein displaying, on the GUI, the predicted DBS lead placement coordinates in relationship to the representation of the patient's brain comprises at least one of:

displaying, on the GUI, the predicted DBS lead placement coordinates in relationship to the patient-specific 3D mesh representation of the brain structure; or displaying, on the GUI, the predicted DBS lead placement coordinates in relationship to the scan of the brain structure.

* * * * *